US009406088B2

(12) United States Patent
Duquette

(10) Patent No.: US 9,406,088 B2
(45) Date of Patent: Aug. 2, 2016

(54) SYSTEM AND METHOD FOR DISPLAYING MARKET DATA IN AN ELECTRONIC TRADING ENVIRONMENT

(71) Applicant: Trading Technologies International, Inc., Chicago, IL (US)

(72) Inventor: Douglas R. Duquette, Glencoe, IL (US)

(73) Assignee: Trading Technologies International, Inc., Chicago, IL (US)

(*) Notice: Subject to any disclaimer, the term of this patent is extended or adjusted under 35 U.S.C. 154(b) by 0 days.

(21) Appl. No.: 15/009,489

(22) Filed: Jan. 28, 2016

(65) Prior Publication Data

US 2016/0148313 A1    May 26, 2016

Related U.S. Application Data

(63) Continuation of application No. 12/693,594, filed on Jan. 26, 2010, now Pat. No. 9,280,790, which is a continuation of application No. 11/361,217, filed on Feb. 24, 2006, now Pat. No. 7,689,499.

(60) Provisional application No. 60/656,028, filed on Feb. 24, 2005.

(51) Int. Cl.
*G06Q 40/00* (2012.01)
*G06Q 40/04* (2012.01)

(52) U.S. Cl.
CPC .................................. *G06Q 40/04* (2013.01)

(58) Field of Classification Search
USPC .......................................................... 705/35
See application file for complete search history.

(56) References Cited

U.S. PATENT DOCUMENTS

| | | | |
|---|---|---|---|
| 6,912,511 B1 | 6/2005 | Eliezer et al. |
| 6,993,504 B1 | 1/2006 | Friesen |
| 7,587,357 B1 | 9/2009 | Buck |
| 7,620,588 B1 | 11/2009 | Duquette |
| 7,689,499 B1 | 3/2010 | Duquette |
| 7,761,362 B2 | 7/2010 | Triplett |
| 7,827,091 B2 | 11/2010 | Cutler et al. |
| 2002/0085017 A1 | 7/2002 | Pisutha-Arnond et al. |
| 2005/0125328 A1 | 6/2005 | Schluetter |
| 2005/0187854 A1 | 8/2005 | Cutler et al. |
| 2005/0192887 A1 | 9/2005 | Triplett |
| 2006/0069635 A1 | 3/2006 | Ram et al. |
| 2010/0131387 A1 | 5/2010 | Duquette |

OTHER PUBLICATIONS

Gabriel Kim and the Staff of Vault, "Vault Career Guide to Sales & Trading", Vault Career Library, 2004, p. 29.
Harris, Larry. Trading & Exchanges. Oxford University Press. 2003. pp. 374-376.

*Primary Examiner* — Jason M Borlinghaus
(74) *Attorney, Agent, or Firm* — McDonnell Boehnen Hulbert & Berghoff LLP

(57) ABSTRACT

A trading interface is provided for displaying market data related to a tradeable object being traded at an electronic exchange. According to one example embodiment, market data related to a tradeable object is displayed in relation to a value axis, such as a price axis. As new market data is received, the displayed market data is updated and may be repositioned so that a trader can view current market conditions in a viewable portion of the interface. The interface also includes a number of market movement indicators that assist a trader in tracking market movement. These viewable references allow a trader to navigate and immediately understand the "real" direction of the market activity despite any underlying adjustment of the viewable area of the trading interface.

9 Claims, 9 Drawing Sheets

SYSTEM AND METHOD FOR DISPLAYING MARKET DATA IN AN ELECTRONIC TRADING ENVIRONMENT

CROSS REFERENCE TO RELATED APPLICATIONS

The present application is a continuation of U.S. patent application Ser. No. 12/693,594, filed Jan. 26, 2010, which is a continuation of U.S. patent application Ser. No. 11/361,217, filed Feb. 24, 2006, now U.S. Pat. No. 7,689,499, entitled "System and Method for Displaying Market Data in an Electronic Trading Environment," which claims priority to U.S. Provisional Patent Application Ser. No. 60/656,028 filed Feb. 24, 2005, entitled "Hand-eye, electronic trading interface, with responsive display of market depth and order parameter input tracking system, responsive to changes in the configuration of "most recent" market depth", the entire contents of each of which are incorporated herein by reference for all purposes.

TECHNICAL FIELD

The present invention is directed to electronic trading. More specifically, the present invention is directed to a system, method, and a graphical interface for displaying market information and entering orders in an electronic trading environment.

BACKGROUND

Trading methods have evolved from a manually intensive process to a technology enabled, electronic platform. With the advent of electronic trading, a user or trader can be in virtually direct contact with the market, from practically anywhere in the world, performing near real-time transactions.

Electronic trading is generally based on a host exchange, one or more computer networks, and client devices. In general, the host exchange includes one or more centralized computers to form the electronic heart. Its operations typically include maintaining an exchange order book that records unexecuted orders, order matching, providing price and order fill information, and managing and updating a database that records such information. The host exchange is also equipped with an external interface that maintains uninterrupted contact to the client devices and possibly other trading-related systems.

Using client devices, traders link to the host exchange through one or more networks to trade tradeable objects. As used herein, the term "tradeable object" refers to anything that can be traded with a quantity and/or price. It includes, but is not limited to, all types of traded events, goods and/or financial products, which can include, for example, stocks, options, bonds, futures, currency, and warrants, as well as funds, derivatives and collections of the foregoing, and all types of commodities, such as grains, energy, and metals. The tradeable object may be "real," such as products that are listed by an exchange for trading, or "synthetic," such as a combination of real products that is created by the user. A tradeable object could actually be a combination of other tradeable objects, such as a class of tradeable objects.

A client device is a computer such as a personal computer, laptop computer, hand-held computer, and so forth that has network access. A network is a group of two or more computers or devices linked together in any fashion, which may be characterized by topology, protocol, and architecture. For example, some market participants may link to the host through a direct network connection such as a T1 or ISDN. Some participants may link to the host exchange through direct network connections and through other common network components such as high-speed servers, routers, and gateways that allow a trader to connect to an electronic exchange. The Internet, a well-known collection of networks and gateways, can be used to establish a connection between the client device and the host exchange. There are many different types of wired and wireless networks and combinations of network types known in the art that can link traders to the host exchange.

Electronic markets are often very volatile, with prices that can move rapidly in wildly variable ways at unknowable times for unknowable durations. To profit in these markets, traders must be able to react quickly to all possible market configurations. A skilled trader with the quickest, most responsive and task reducing software, the fastest communications, and the best analytical tools, can significantly improve the likelihood of a profitable result from trading activities. The slightest speed advantage in knowing the "real", non-latent market and management of a proper response can generate significant returns in a fast moving market.

It would be beneficial to provide a trading interface that can accommodate varying market conditions and allow a trader to view current market conditions.

BRIEF DESCRIPTION OF THE DRAWINGS

Example embodiments are described herein with reference to the following drawings, in which.

DETAILED DESCRIPTION

I. Overview

Figure 1:
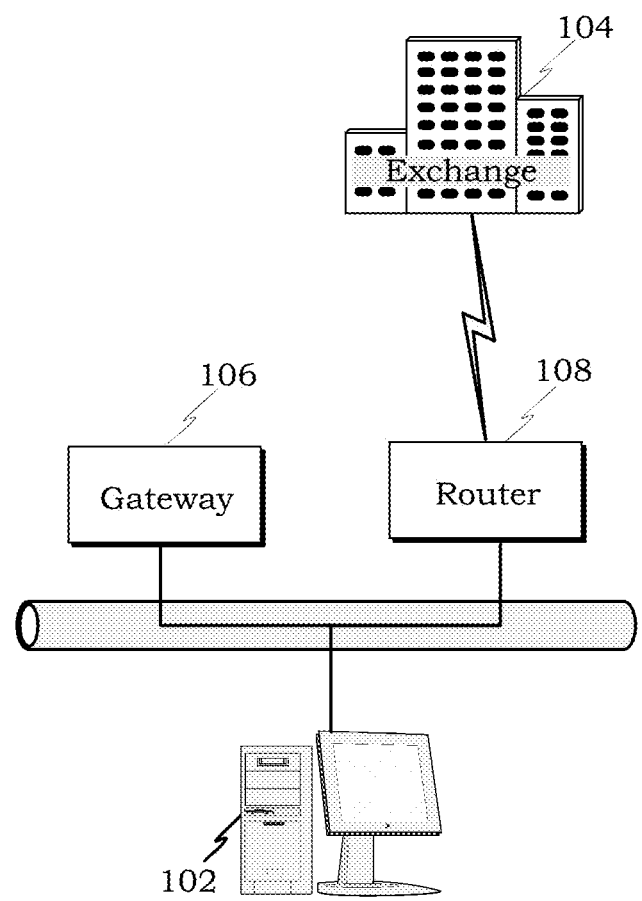
FIG. 1 illustrates a trading system for electronic trading according to an example embodiment, wherein the trading system includes a trading station where a trader can submit bids and offers for a tradeable object being traded at an electronic exchange.

Example systems and associated methods described below provide a trading interface that displays market depth in relation to a value axis. The example trading interface arranges market information in an easy to read fashion by orienting the bid and ask quantities along a value axis. The values on the value axis may display prices for a given tradeable object, and the prices may be arranged along the value axis in a numerical order in increments. Additionally, as will be described in greater detail below, some of the values displayed in relation to the value axis may be collapsed in certain areas of the interface to allow a trader to view and trade all available market depth prices.

According to one example embodiment of a trading interface, bid and ask indicators are displayed in alignment with their respective prices, and may also fluctuate up/down or left/right responsive to market changes as provided in market updates from an electronic exchange. The example trading interface allows a trader to view current market conditions by letting the bid and ask indicators move along the value axis to reflect a change in the inside market and then the interface will (according to a particular algorithm) automatically reposition the indicators to locations substantially at the center of the trading interface. Thus, this drifting and repositioning effect of the trading interface preferably keeps the market depth within a viewable trading screen by automatically repositioning or re-centering the trading screen based on the market movement and the chosen algorithm, the example embodiments of which will be illustrated in greater detail below.

According to one example embodiment, a trader can define a ratio that may be used to control when and by how many ticks the displayed market depth is re-positioned to maintain the full view of the market depth on a trading screen. The example ratio can include a first value to control when the re-positioning should be triggered, and a second value that could be used to control by how many ticks the market depth should be adjusted. According to one example embodiment, the first value may define a number of ticks that the best bid/best ask indicators are displayed above/below a reference point, such as the center or approximately the center of the trading interface. For example, and as will be described in greater detail below, if the most recent best bid is greater than the reference point and the most recent best bid is greater than the previous bid which also was above the reference point, and the most recent best bid is greater than the previous bid by at least the number of ticks defined with the first value of the ratio, the entire market depth display may be re-positioned downward towards the reference point, such as a center line, by the number of ticks defined with the second value of the ratio. The opposite can be applied in relation to the current best ask, as will be described below. The process of automatic repositioning can take many different formats, including slow movement repositioning to rapid movement repositioning, or yet some other configuration.

The trading interface also includes a number of market movement indicators that can assist a trader in tracking changes in the market, such as determining if the market has moved up or down in value, while the view of the market data displayed on the interface has been updated (or is in the process of being updated) due to a repositioning command. These market movement indicators are particularly useful when using a screen display of the type described herein. As will be described in greater detail later, each market movement indicator may be positioned at a price level selected by a user. According to one example embodiment, as the location of the selected price may change when a view of the interface is updated based on changing market conditions, the indicator is moved as well. Then, for example, if a market related parameter, such as an inside market parameter, a last traded price, or yet some other parameter, crosses the price associated with the indicator or is within a price range defined based on the price level selected for the indicator, an alert can be generated to alert a trader of the market movement. As will be described below, the alert can take many different formats, including sound alerts, as well as graphical alerts, such as changing the format of the indicator. Different indicators, including detecting a new best bid or a new best ask, that may assist a trader in tracking direction of the market will be described in greater detail with reference to the subsequent figures.

The example trading interface also allows a trader to lock a location of a cursor corresponding to a user input device to a specific area on the interface such that, when the display is dynamically updated based on changing market conditions that cause repositioning of the market view, the location of the cursor moves as well such that the cursor remains positioned at the selected location. For example, a trader may wish to lock the location of the cursor to an area of an order entry region corresponding to a predefined price level so that, even when the display is updated, the trader can quickly enter an order at the desired price level.

While the example embodiments are described herein with reference to illustrative embodiments for particular applications, it should be understood that the example embodiments are not limited thereto. Other systems, methods, and advantages of the present embodiments will be or become apparent to one with skill in the art upon examination of the following drawings and description. It is intended that all such additional systems, methods, features, and advantages be within the scope of the present invention, and be protected by the accompanying claims.

II. A First Example Trading System

FIG. 1 illustrates an example electronic trading system in which the example embodiments may be employed. In this example, the system comprises a trading station 102 that accesses an electronic exchange 104 through a gateway 106. Router 108 is used to route messages between the gateway 106 and the electronic exchange 104. The electronic exchange 104 includes a computer process (e.g., the central computer) that matches buy and sell orders sent from the trading station 102 with orders from other trading stations (not shown). The electronic exchange 104 may list one or more tradeable objects for trading. While not shown in FIG. 1 for the sake of clarity, the trading system may include other devices that are specific to the client site like middleware and security measures like firewalls, hubs, security managers, and so on, as understood by a person skilled in the art.

Regardless of the type of order execution algorithm used, the electronic exchange 104 provides market information to the subscribing trading station 102. Market information may include data that represents just the inside market. The inside market is the lowest sell price (best ask) and the highest buy price (best bid) at a particular point in time. Market information may also include market depth. Market depth refers to quantities available at the inside market and can also refer to quantities available at other prices away from the inside market. The quantity available at a given price level is usually provided by the host exchange in aggregate sums. In other words, an exchange usually provides the total buy quantity and the total sell quantity available in the market at a particular price level in its data feed. The extent of the market depth available to a trader usually depends on the exchange. For instance, some exchanges provide market depth for all (or most) price levels, while some provide only quantities associated with the inside market, and others may provide no market depth at all. Additionally, the exchange 104 can offer other types of market information such as the last traded price (LTP), the last traded quantity (LTQ), and order fill information.

The computer employed as the trading station 102 generally can range from a hand-held device, laptop, or personal computer to a larger computer such as a workstation and multiprocessor. An illustrative personal computer may use Pentium™ microprocessors and may operate under a Windows operating system, or yet may use some other microprocessor or operating system. Generally, the trading station 102 includes a monitor (or any other output device) and an input device, such as a keyboard and/or a two or three-button mouse to support click based trading, if so desired. One skilled in the art of computer systems will understand that the present example embodiments are not limited to any particular class or model of computer employed for the trading station 102 and will be able to select an appropriate system.

The computer employed as the gateway 106 generally can range from a personal computer to a larger or faster computer. An illustrative gateway 106 computer may use Pentium™ microprocessors and may operate under a Windows (server or workstation) operating system, or yet some other system. Generally, the gateway 106 may additionally include a monitor (or any other output device), input device, and access to a database, if so desired. One skilled in the art of computer systems will also understand that the present example embodiments are not limited to any particular class or model of computer(s) employed for the gateway 106 and will be able to select an appropriate system.

It should be noted that a computer system that may be employed here as a trading station or a gateway generally includes a central processing unit, a memory (a primary and/or secondary memory unit), an input interface for receiving data from a communications network, an input interface for receiving input signals from one or more input devices (for example, a keyboard, mouse, etc.), and an output interface for communications with an output device (for example, a monitor). A system bus or an equivalent system may provide communications between these various elements.

It should also be noted that the trading station 102 generally executes application programs resident at the trading station 102 under the control of the operating system of the trading station 102. Also, the gateway 106 executes application programs resident at the gateway 106 under the control of the operating system of the gateway 106. In other embodiments and as understood by a person skilled in the art, the function of the application programs at the trading station 102 may be performed by the gateway 106, and likewise, the function of the application programs at the gateway 106 may be performed by the trading station 102.

The actual electronic trading system configurations are numerous, and a person skilled in the art of electronic trading systems would be able to construct a suitable network configuration. For the purposes of illustration, some example configurations are provided to illustrate where the elements may be physically located and how they might be connected to form an electronic trading system. These illustrations are meant to be helpful to the reader, and they are not meant to be limiting. According to one example illustration, the gateway device may be located at the client site along with the trading station, which is usually remote from the matching process at the electronic exchange. According to this instance, the trading station, the gateway, and the router may communicate over a local area network, and the router may communicate with the matching process at the electronic exchange over a T1, T3, ISDN, or some other high speed connection.

In another example illustration, the client site may be located on the actual grounds of the electronic exchange (for example, in the building of the exchange). According to this instance, the trading station, the gateway, and the router may still communicate over a local area network, but the router may communicate with the matching process at the electronic exchange through another connection means besides a T1, T3, or ISDN.

In yet another example illustration, the gateway may be housed at, or near, its corresponding electronic exchange. According to this instance, the trading station may communicate with the gateway over a wide area network or through the use of a T1, T3, ISDN, or some other high speed connection.

In another example illustration, the gateway may be located remote from the trading station and remote from the electronic exchange, which might be particularly useful in systems that include interconnection of multiple trading networks. Thus, one trading network might have gateway access to an electronic exchange. Then, other trading networks may communicate with the trading network that has gateway access through a T1, T3, ISDN, or some other high speed connection.

III. A Second Example Trading System

Figure 2:
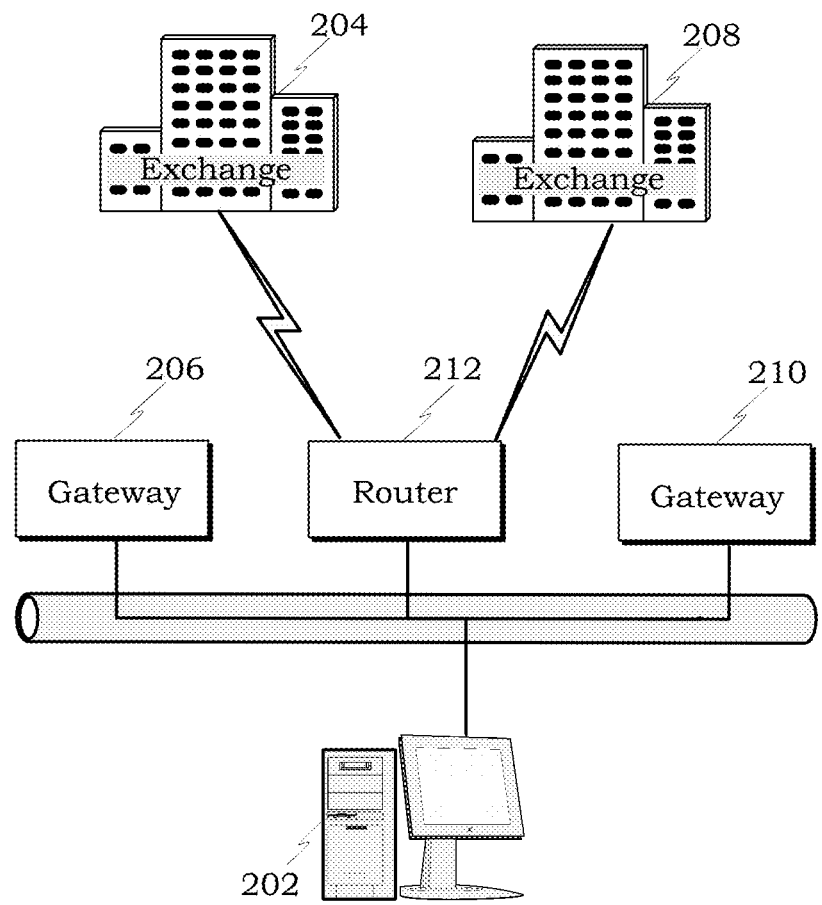
FIG. 2 illustrates another trading system for electronic trading according to another example embodiment, wherein the trading system includes a trading station where a trader can submit bids and offers for a tradeable object being traded at more than one electronic exchange.

FIG. 2 illustrates another example trading system that uses similar computer elements as shown in FIG. 1, in which, the example embodiments may be employed to trade at multiple electronic exchanges. The system comprises a trading station 202 that can access multiple electronic exchanges 204 and 208. In this particular embodiment, electronic exchange 204 is accessed through gateway 206 and electronic exchange 208 is accessed through another gateway 210. Alternatively, a single gateway may be programmed to handle more than one electronic exchange. Router 212 is used to route messages between the gateways 206 and 210 and the electronic exchanges 204 and 208. While not shown in the figure, the system may include other devices that are specific to the client site like middleware and security measures like firewalls, hubs, security managers, and so on, as understood by a person skilled in the art. Additional electronic exchanges may be added to the system so that the trader can trade at any number of exchanges, if so desired.

The trading system presented in FIG. 2 provides the trader with the opportunity to trade tradeable objects listed at different electronic exchanges. To some traders, there can be many advantages with a multi-exchange environment. For example, a trader could view market information from each tradeable object through one common visual display. As such, price and quantity information from the two separate exchanges may be presented together so that the trader can view both markets simultaneously in the same window. In another example, a trader can spread trade different tradeable objects listed at the different electronic exchanges.

As indicated earlier, one skilled in the art of electronic trading systems will understand that the present embodiments are not limited to the particular configurations illustrated and described with respect to FIG. 1 and FIG. 2, and will be able to design a particular system based on the specific requirements (for example, by adding additional exchanges, gateways, trading stations, routers, or other computers serving various functions like message handling and security). Additionally, several networks, like either of the networks shown in FIG. 1 or FIG. 2, may be linked together to communicatively access one or more electronic exchanges.

IV. Graphical Interface

Example systems and associated methods described herein provide a trading interface that displays market depth in relation to a value region that, according to the example embodiments described herein will be arranged to form a value axis, such as a price axis. The example trading interface may arrange market information in an easy to read fashion by orienting the bid and ask quantities along a value axis, with the bids and asks being updated and changing locations in relation to the value axis upon receiving new market data. The interface also allows a trader to view current market conditions by automatically repositioning the inside market or any other user-defined parameter, such as the last traded price, for example, to the center of the trading interface upon detecting that the inside market is displayed too far from the desired location, such as the center of the trading interface. More specifically, the trading interface preferably keeps the market depth within a viewable trading screen by automatically repositioning the trading screen based on the market movement and user defined settings. As will be described in reference to the subsequent figures, the trading interface also allows a trader to select one or more points of interest, such as specific prices displayed on the interface. In such an embodiment, when the view of the market data is updated or repositioned, and the market changes such that the inside market or yet some other user-defined market related parameter, such as the last traded price, is at the selected price or within a range designated based on the selected price, an alert could be provided to a trader to inform the trader of the occurring market conditions. For example, the indicator could be modified, disappear, start flashing, or yet change in a different manner based on the user-defined settings. Also, audio alerts could be provided as well to alert a trader of the changing market conditions.

Figure 3:
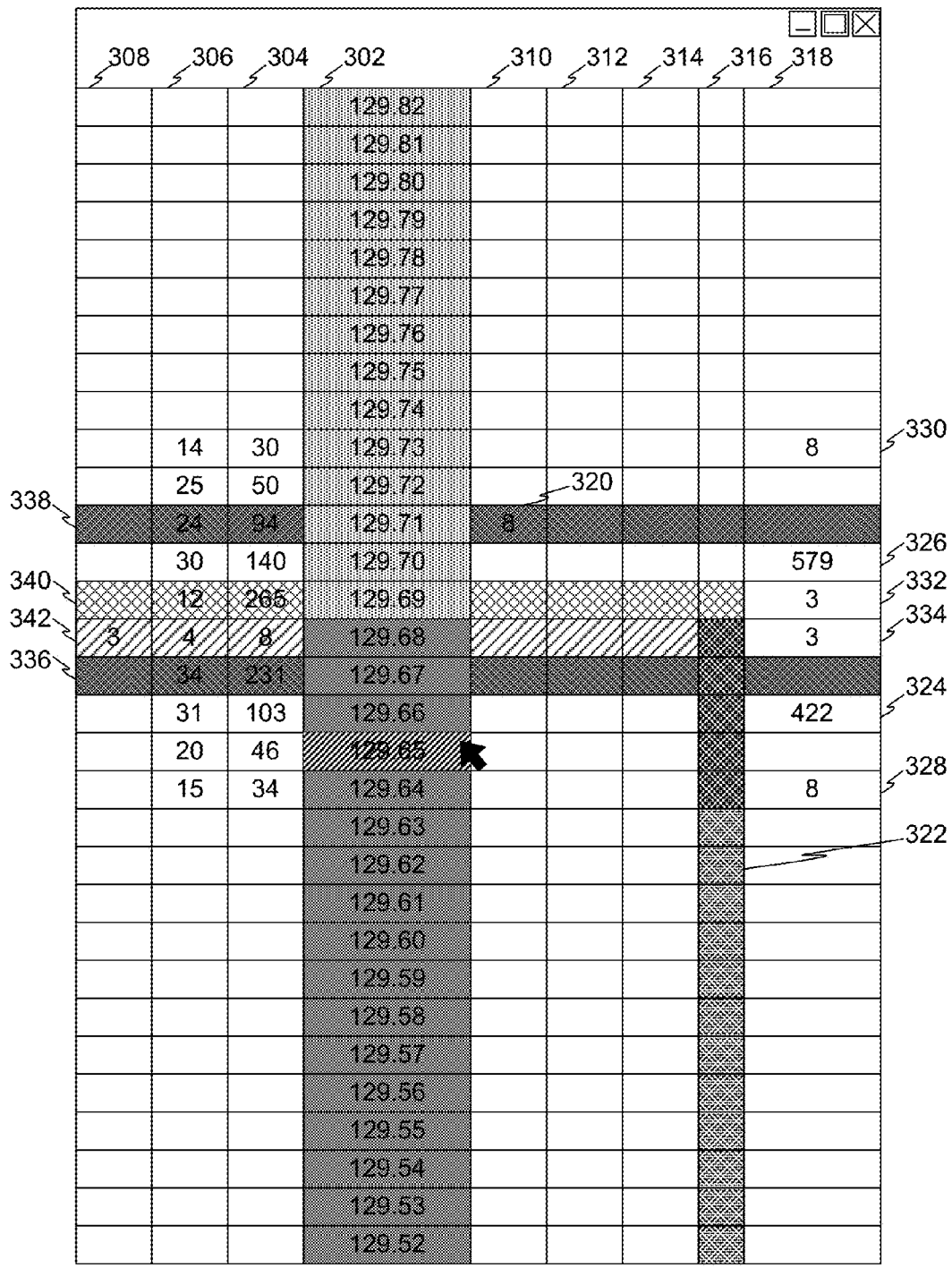
FIG. 3 is a block diagram illustrating a trading interface according to one example embodiment.

FIG. 3 is a block diagram illustrating a graphical trading interface 300 according to one example embodiment.

The graphical trading interface 300 displays market information relative to a value region 302 illustrated in the format of a value axis. According to one example embodiment, the value axis 302 displays prices corresponding to a tradeable object. However, different values could be displayed on the value axis 302 as well, such as a derivative of the price, for example. As shown in FIG. 3, the prices on the value axis 302 may be arranged in a numerical order in increments; however, different embodiments, with some areas on the interface being programmed to use different price increments than others, will be illustrated in relation to the subsequent figures as well. It should be understood that more than one axis (or an arrangement of values) may be used to represent the "value axis," so long as there is some viewable relationship between the axes.

The values on the value axis 302 normally move as the market view is adjusted to maintain it in a predefined area of the interface. According to one example embodiment, the trading interface 300 preferably keeps the full market depth (if possible, given some exchanges may provide more levels of market depth information than the trading interface can display) within a viewable trading screen by automatically repositioning the trading screen based on the market movement and user defined settings. For example, if the inside market prices move up by one or more ticks thus causing the inside market to be displayed higher than in the previous market view, the value axis 302 could automatically move in the opposite direction by one or more ticks thereby moving the inside market prices or yet another market related parameter toward the centralized viewable reference point, the details of which will be described in reference to the subsequent figure. Also, market information displayed in relation to the value axis 302 fluctuate along the price levels up or down as the prices move up or down on the value axis 302 based on changing market conditions.

In addition to the value axis 302, the trading interface 300 includes a plurality of other regions 304-318 arranged in columns, with each column including a number of locations corresponding to a plurality of values displayed on the value axis 302. The market depth column 304 contains indicators that represent bid and ask information. As the prices displayed in the value axis 302 move up or down responsive to repositioning, the indicators in the market depth column 304 move accordingly up or down along the value axis 302. According to one example embodiment, the indicators in the market depth column 304 can be color-coded to differentiate bids from asks. For example, cells in the market depth column 304 corresponding to bids could be displayed in blue, while those corresponding to asks could be red. However, different colors could be used as well.

In the example shown in FIG. 3, the current best bid of 8 is at the price level of 129.68, and the current best ask of 265 is at the price level of 129.69. While the interface 300 shows five market depth levels on each bid and ask side of the market, it should be understood that the number of shown market depth levels could be exchange-specific, as some exchanges provide more or fewer levels than other exchanges. The number of displayed market depth levels could also depend on user-defined settings. Additionally, while the interface 300 shows a single market depth column (displaying bid and ask information in the same column), two different regions could be used as well to display market depth data corresponding to the tradeable object, with one region displaying bid indicators and another region displaying ask indicators.

The column 306 displays values that represent the number of pending orders that create the overall market depth quantity displayed at each price level in the market depth column 304. For example, based on the information displayed in FIG. 3, there are 4 pending orders having the total quantity of 8 at the best ask price of 129.68. Then, column 308 indicates the total quantity traded on the current best bid, which in this example corresponds to a total quantity of 3. While the column 308 displays the total quantity traded in relation to the best bid price, it should be understood that the number of trades could be displayed in relation to more than one price level based on the trader's preferences.

Referring now to the regions to the right of the value axis 302, the region 310 may display order indicators corresponding to the trader's working orders. One such working order indicator, a sell order indicator 320, is displayed in relation to the price level of 129.71. As shown in FIG. 3, the indicator 320 displays a working order quantity of 8 corresponding to the sell order. It should be understood that working order indicators could be color-coded to differentiate a buy order from a sell order. Alternatively, different indicators for a sell order vs. a buy order could be used as well, such as "+" and "−" or yet some other identifiers. In addition to the indicators corresponding to the working orders, the region 310 could display indicators corresponding to potential orders, e.g., conditional orders that will be submitted to an electronic exchange upon detecting a predefined condition, such as time for a timed order, or yet some other market related condition that is preset to activate submission of an order to an electronic exchange. It should be understood that different indicators from those being used in relation to the working orders could be used to denote potential orders.

The region 312 displays working order indicators and potential order indicators corresponding to trader's orders initiated from sources other than the trader interacting manually, at least in part, with the trading interface. The region 314 may display an indicator that corresponds to a trader's net position. According to one example embodiment, the net position indicator could be displayed at an average price calculated based on the prices of the fills that comprise the net position shown at the price level where the net position indicator is displayed. Alternatively, each filled order could be shown summarily at each corresponding price. Also, each net position indicator displayed in the region 314 could be color-coded to indicate a long position vs. a short position, and a value could be displayed in relation to each net position indicator to define a net quantity at the price level at which the indicator is displayed.

The region 316 is used to display a point of reference marker 322 that can be used to indicate a new higher/lower bid or a new higher/lower ask. According to an example embodiment, the new bid/ask can be compared to the previous bid/ask to detect the new value. It should be understood that any indicator format could be used to indicate detecting a change in the level of the inside market. According to one example embodiment, a color-coded column of cells in the region 316 starting from the bottom corner of the interface up to the level of the new higher bid could be displayed and could temporarily flash to indicate the new higher bid. Similar indicator could be used when the new lower best ask is detected, with the difference that the column of the color-coded cells would be displayed in the region 316 starting from the upper portion of the interface down to the current level of the best new ask. According to one example embodiment, the flashing column for the new higher bid could be blue, and the flashing column for the new lower ask could be red. However, different colors and formats of the indicators could be used as well.

The region 318 could be used to display any calculated values of interest predefined by a user. For example, indicators 324 and 326 display volume weighted averages "422" and "579" calculated based on the current bids and asks, respectively. Then, indicators 328 and 330 display a range in ticks between the worst bid and the worst ask, and indicators 332 and 334 display a difference between 324 and 326 as net ticks in between. It should be understood that the displayed values are only example, and values could represent any user defined relationship derivative determined from any data in the system.

Similarly to the market depth indicators and values displayed in the value axis 302, the indicators in other regions also change positions when a repositioning command is received. Also, the values that are displayed in relation to the indicators are recalculated based on new market updates that are received from an electronic exchange for a tradeable object to reflect current market conditions. It should be understood that the indicators displayed in the interface 300 could be based on market data of a tradeable object corresponding to market depth displayed in the market depth region 304 or yet a different tradeable object.

The trading interface 300 also allows a trader to lock a selection cursor at a user-specified location, so that when physical locations of displayed values and indicators change upon receiving a repositioning command, the cursor is repositioned accordingly so that it remains positioned at the user-specified location. This locking mechanism is beneficial to a trader because, as the prices displayed on the trading interface 300 can unexpectedly move upon the market changes, the user's cursor will be automatically repositioned as well to a new position of the user-specified location. The preservation of the most recent user's intent coupled to a changing market view responsive to the most recent market depth update allows a trader, among other things, to place orders at desired price levels.

The locked location of the cursor may be shown on the interface by highlighting a location, such as a cell, in one of the regions of the interface 300. In the embodiment illustrated in FIG. 3, the locked location of the cursor corresponds to the price level of 129.65 and is identified by highlighting a cell corresponding to 129.65 on the value axis 302. According to one example embodiment, different indicators could be used to differentiate a potential selection based on a current position of the cursor vs. an actual selection based on an actual selection of a specific location on the trading interface 300 with a user input device. For example, if a user were to select with a user input device a location corresponding to the price level of 129.65 to enter a buy order at the price level of 129.65, a different indicator or a different color could be used to indicate that a fully parameterized order ticket is in the queue, and is ready to be sent to an electronic exchange for matching. More information on methods and embodiments for locking a cursor in relation to an item of interface can be found in the commonly assigned U.S. patent application Ser. No. 10/729,123, entitled "Method and System for Displaying a Cursor on a Trading Screen," filed on Dec. 5, 2003, incorporated herein by reference.

It should be understood that many different order entry mechanisms could be used to send orders to an electronic exchange. According to one example embodiment, a user could select a location in the market depth region 304 to enter orders. For example, using a mouse as a user selection input, a right click could activate placement of a buy order, and a left click could activate placement of a sell order, or vice versa. In such an embodiment, a price of the order would be determined based on the selected location in the market depth region 304. However, it should be understood that a trader could also select any location in a different region, such as the price region 302, to enter an order. Also, it should be understood that a user could preset a number of default parameters to be used in relation to orders, such as a default order quantity. Alternatively, a confirmation ticket could be used to allow a trader to confirm or alter order parameters before the order is sent to an electronic exchange.

While the market depth and prices displayed on the trading interface 300 may fluctuate up and down based on changing market conditions, in addition to the indicators in the region 316, the interface 300 provides a trader other means that can be used by a trader to accurately track directional movements of the market. According to one example embodiment, a trader can mark one or more price levels to be used as reference points to determine direction of the market as the market data displayed on the interface changes. A trader could select a reference point by selecting a desired price level with a predetermined selection input, such as selecting a predefined key combination, before clicking on a desired price level. Upon selecting a desired price level to be used as a reference point, the trading interface could display a market movement indicator in relation to the selected price level. The first such market movement indicator is shown at 336 and corresponds to the current bid price of 129.67, and the second market movement indicator is shown at 338 at the current ask price of 129.71. While each indicator 336 and 338 is a horizontal indicator and highlights the entire row corresponding to each respective price, it should be understood that different indicator formats could be used as well based on the user's preferences. Also, the indicators could be color-coded to differentiate the indicator at the bid price from that at the ask price.

Similarly to other indicators displayed on the trading interface 300, the market movement indicators also move as the market conditions change and as the prices corresponding to the market movement indicators 336 and 338 are displayed at different locations on the interface 300. Using such indicators, a trader can see the position of the marked price in relation to the current market conditions. Additionally, such indicators could be differentiated by color or some other means so as to indicate a price level where sellers became active or aggressive thereby creating a "resistance" price level, or alternatively where buyers may have indicated interest by becoming active thereby creating "support" price levels. Such indicators could be either set manually or by other conditionally automatic means.

According to one example embodiment, as the market conditions change, such as when the current market including any designated market related parameter falls below, goes above, or hits the price level marked with the indicator, an alert could be provided to signal to a trader the occurring market changes. It should be understood that, based on the configuration, the same or a different alert could also be provided when current market is within a predefined range of prices determined based on the marked price level, such when the current market is getting close to the market price level. The alert could take many different formats. For example, the indicator could start flashing, change color, and then disappear to alert a trader that the market crossed the price level corresponding to the indicator. According to one example embodiment, if a market movement indicator is associated with a "resistance" or a selling price level, such as indicator 338, an alert could be provided when, upon receiving a market update, the current best bid is now at or above the price corresponding to the selling indicator. Similarly, for an indicator that is placed at a price level that corresponds to a "support" or buying price level, such as indicator 336, an alert could be provided when, upon receiving a market update, the best ask is now lower than or equal to the price corresponding to the buying indicator.

It should be understood that the time when an alert is provided could depend on the trader's preferences. For example, rather than providing an alert at the time when the market reaches the price level marked with an indicator, a trader may prefer to view or hear an alert when the market reaches a price level a few ticks away from the marked price. Further, alternatively, two alerts could be provided, the first one, at the time when the market reaches the price corresponding to the indicator, and the second one, at the time when the market reaches a few ticks away from the marked price. In such an embodiment, the market movement indicator could be erased at the time when the second alert is provided. Those skilled in the art will understand that many different alternative embodiments are possible as well.

As mentioned earlier, when the market crosses the price marked with a market movement indicator, the indicator could be then or at some later time erased upon alerting the user of the market condition. Then, a trader could place a new indicator at another price level to be used as a reference in tracking future market changes. According to an alternative embodiment, a new indicator could be placed automatically at some user defined location, either at the inside market or at some other price level, such as a number of ticks below or above the inside market, depending on the user's preferences. It should be understood that different embodiments of activating market movement indicators and modification of the indicators could be used as well.

The market movement indicators described above can assist a trader in instantly recognizing the presence and magnitude of directional price activity relative to the marked price levels. These viewable references allow a trader to navigate and immediately understand the "real" direction of the market activity despite any underlying adjustment of the viewable area of the trading interface. Additionally, the indicated price levels serve as a point of reference as to where other participants were able to turn the market prices in the opposite direction thus alerting the trader to carefully and dynamically assess his trading decisions as the market flows toward and away from or through the indicated price levels.

In addition to the indicators described above, the trading interface 300 may also automatically display bid and ask line indicators. To illustrate one example operation of the bid/ask lines, let's assume that an ask line is positioned at 129.69, as shown at 340. Then, when the offered quantity disappears, such as when the quantity of 265 is bought and/or cancelled, and a new bid is placed at the price of 129.69, the ask line would be deleted, and a new bid line would replace the old ask line. Such market activity is often referred to as "a turn in the inside market." According to the example above, a turn in the market would occur when the best ask price of 129.69 would turn into a best bid at 129.69 or a higher price. In general, if the best bid is equal to or greater than the price corresponding to the ask line, the ask line would be erased. Then, if the ask quantity at the ask line is bought but the bid remains below, then the ask line remains unchanged until it is bid through. Similarly, if the best ask is equal to or lower than the price corresponding to the bid line, the bid line would be erased. In other words, when the market "turns" from offered to bid or vice versa, such a condition may be indicated with a new bid line or a new ask line, respectively.

Similarly, with respect to a bid line at 342, if the bid quantity disappeared (such as when it was sold or cancelled), and a new ask was placed at the price of 129.68 or lower, then a new ask line would be drawn in place of the bid line. It should be understood that the bid/ask lines could be color-coded, and different indicators could be used as well to differentiate between the two lines. While FIG. 3 shows only a single ask line and a single bid line, it should be understood that more than one bid line and more than one ask line could be displayed simultaneously based on the market behavior, such as when the market is moving above or below, or back and forth between previously established bid and ask lines which are currently preserved unless and until the inside market conditionally penetrates the price level relative to the user preset values, as described earlier.

To keep the view of the current market depth in the viewable area of the trading interface 300, one example method allows a trader to enter a ratio that can be used to control the re-positioning functionality of the interface. According to one example embodiment, the ratio may include two values. The first value could be used by a trader to define a number of ticks that the best bid/ask is above/below a reference point, such as a centerline, or a subsequent bid or ask price once the inside market has moved above or below the initial reference point, usually the centerline on the interface 300. Then, the second value could be used to define a number of ticks by which the market view displayed on the interface 300 is to be moved down/up when the best bid/ask is positioned the pre-defined number of ticks above/below the reference point. One example implementation using a ratio of 2:1 would cause the view of an interface to move downward by one tick upon detecting that the best bid has moved up above the reference point by two ticks. It should be understood that different market data points displayed on the interface, other than the best bid/ask, could be used as well to determine when the repositioning of the interface 300 is to be activated. Also, how the market data is repositioned on the interface could be user-configurable. For example, the slow repositioning, down to pixel resolution of the output device, a pixel row by a pixel row, causing market data slowly being moved up or down could be used. A few example methods for repositioning market data on a trading interface can be found in the commonly assigned U.S. patent application Ser. No. 10/609,965, entitled "Repositioning of Market Information on Trading Screens," the contents of which are incorporated herein by reference. However, different configurations could be used as well.

Figure 4A:
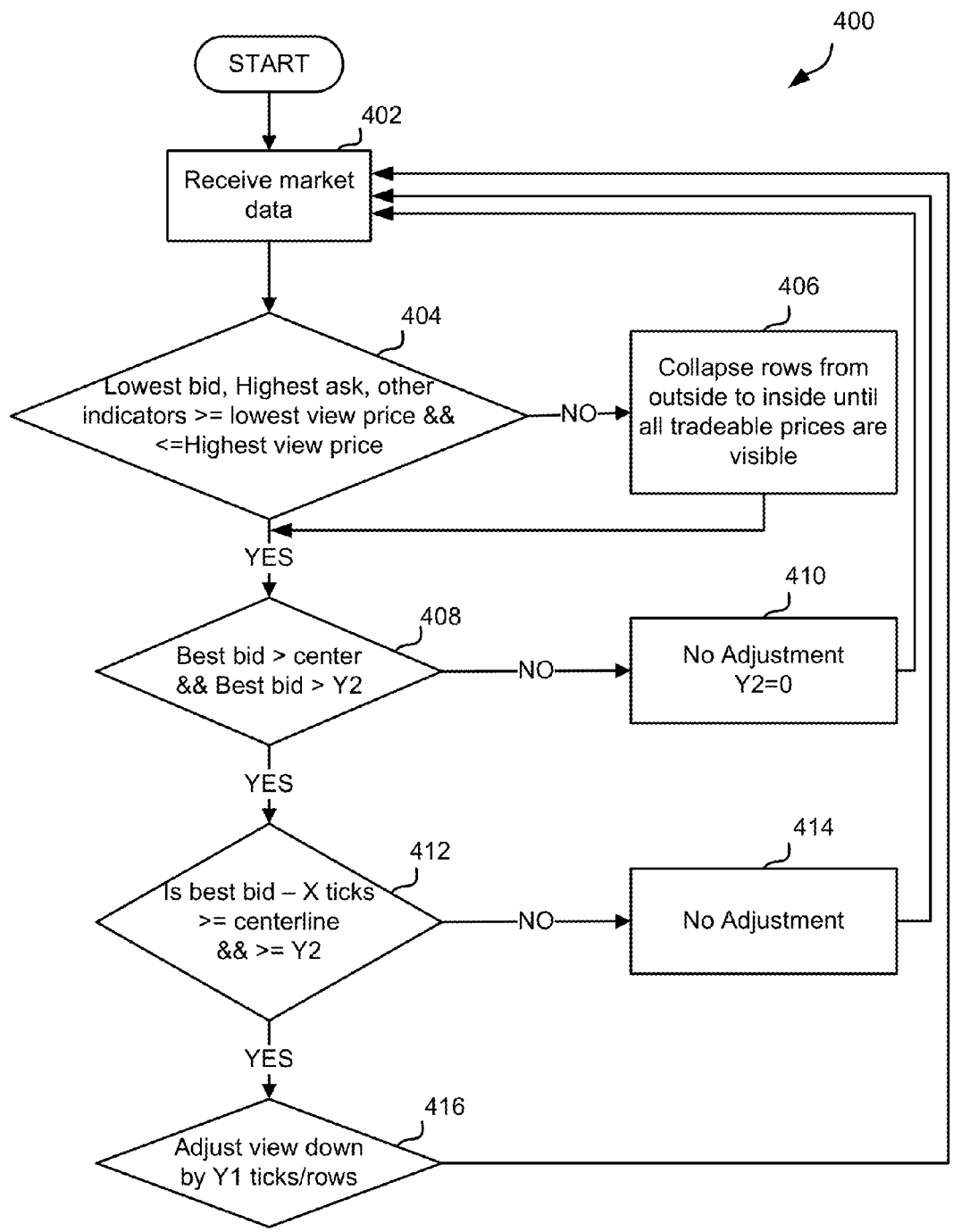
FIGS. 4A and 4B illustrate one method of operation of a graphical user interface according to one example embodiment.
Figure 4B:
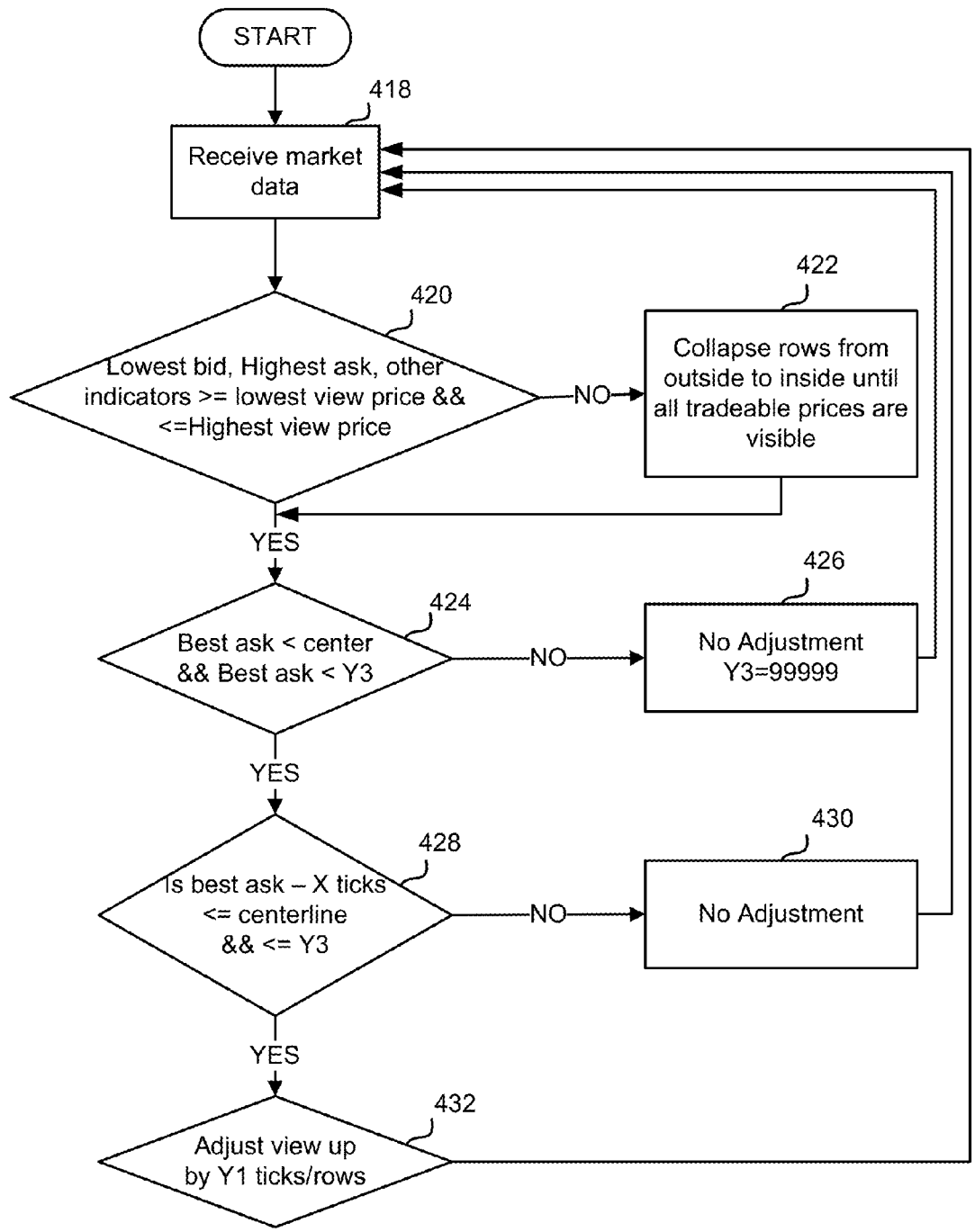

FIGS. 4A and 4B illustrate one method 400 for repositioning market data on a graphical user interface according to one example embodiment. While the method 400 is separated into two different figures, with FIG. 4A corresponding to the best bid analysis, and FIG. 4B corresponding to the best ask analysis, it should be understood that the two analyses are ran simultaneously upon receiving a market update from an electronic exchange.

Referring to FIG. 4A, at 402, a new market update related to a tradeable object is received from an electronic exchange. The market update includes, among other market data, the best bid and the best ask corresponding to the tradeable object. At step 404, it is determined if the lowest bid indicator and the highest ask indicator or any other user-defined indicators are at a price that is higher than or equal to the lowest price currently viewable on a trading interface. Additionally, it is determined if any or all of the mentioned indicators are at price levels that are lower or equal to the highest price currently viewable on the trading interface. If any of the indicators are outside the viewable area, at 406, one or more rows, starting from the most outside rows and moving towards the center rows, may be collapsed until all tradeable prices are visible. According to one example embodiment, rows corresponding to prices associated with no currently pending tradeable quantity could be collapsed first, as will be illustrated in one of the subsequent figures, to allow a trader the view of as many un-collapsed price levels close to the inside market as possible. Also, it should be understood that, while FIG. 4A refers to collapsing the rows of the interface, it should be understood that columns could be collapsed as well when the layout of the interface is horizontal rather than vertical. Different implementations are possible as well.

Once the rows are collapsed, or the collapsing is not activated, at step 408, it is determined if the best bid is at a price that is higher than a price currently displayed at a reference point, which in this example corresponds to the center of the interface, and if the best bid is greater than Y2, which corresponds to the previous bid. If the conditions in step 408 are not satisfied, no adjustment of the current view of the interface occurs, as shown at 410, and the method continues at 402. Also, as shown in FIG. 4A, the previous best bid is set to "0" until the best bid is established above the reference point, such as above the center line. Then, if the best bid is above the reference point, Y2 can be then reset to a new level above the centerline. If the best ask is found below the reference point, Y2 once again is reset to "0" as the method 400 would be shifted to that shown in relation to FIG. 4B where the best ask, rather than the best bid, would be compared to the reference point. In such an embodiment, the method would once again return to the best bid analysis at the time when the adjusted view of the market displayed the best bid above the reference point on the interface. At 412, it is determined if the best bid minus "X" ticks falls at a price or above the price currently displayed at the centerline, and if the best bid is higher than or equal to "Y2." If it is not, no adjustment of the interface occurs. Otherwise, at 416, the view of the interface is adjusted down by "Y1" ticks or rows. It should be understood that the value of "Y1" could be user configurable.

Referring now to FIG. 4B, the first three steps 418, 420, and 422 correspond to steps 402, 404, and 406 described in reference to FIG. 4A. Then, at 424, it is determined if the best ask is below the center of the interface, and if the best ask is lower than "Y3," the previous ask. If the best ask is not lower than the center and not lower than "Y3," at 426, the view of the interface is left unchanged. Otherwise, at 428, it is determined if the best ask plus "X" ticks falls below or at the centerline, and if it is lower than or equal to "Y3." If it is not, at 430, the view of the interface is left unchanged. Otherwise, at 432, the view of the interface is adjusted up by "Y1" ticks or rows. It should be understood that the same or different values of "Y1" could be used in relation to the adjustment triggered by the position of the best bid and the best ask. Also, as the best ask and the best bid move further from the centerline, such as the best bid or the best ask is, for example, "2X" from the centerline, the value of "Y1" could be proportionately and automatically adjusted to "2Y1." Different variations are possible as well.

Even with the use of the method 400 described above, certain market conditions, such as when the market is moving very rapidly in one direction, could cause data displayed on a trading interface to move extremely fast above or below the viewable area of interface. Such a problem may arise when the market is so fast that the repositioning method cannot react quickly enough to bring the market view to the center of the screen. To prevent the market view moving off the screen, the method 400 could be modified upon detecting certain market conditions, such as when the rate of changing market conditions is above a predefined value. More specifically, upon detecting a rapidly moving market and the market depth reaching a predefined level above the bottom or below the top of the interface, a temporary buffer could be created at the bottom or at the top of the viewable area. According to one example embodiment, such a buffer could be equal to the number of rows of each side of the market depth, such as, for example, 5 rows on the bottom for the bid side, and 5 rows at the top for the ask side. Additional rows could be added for each pending order price indicator or a position indicator. Then, when the market moves so rapidly that the buffer on either side of the interface is activated, the rows corresponding to the buffer may be locked and the prices in the locked rows could change until there is a turn in the market and the method 400 can resume its normal operation. It should be understood that a different number of rows could be set to correspond to a buffer zone, and the buffer zone could be activated based on the user-defined conditions.

Referring back to FIG. 3, the trading interface 300 illustrated one configuration of an interface for displaying market data according to one example embodiment. The following figures will be used to illustrate the operation of the trading interface by showing the display of market depth at later time intervals, with the interfaces maintaining the viewable market depth by repositioning the displayed market data. While for the ease of illustration the following trading interface may omit some indicators that were shown in relation to FIG. 3, it should be understood that the same or additional indicators could be used as well.

Figure 5:
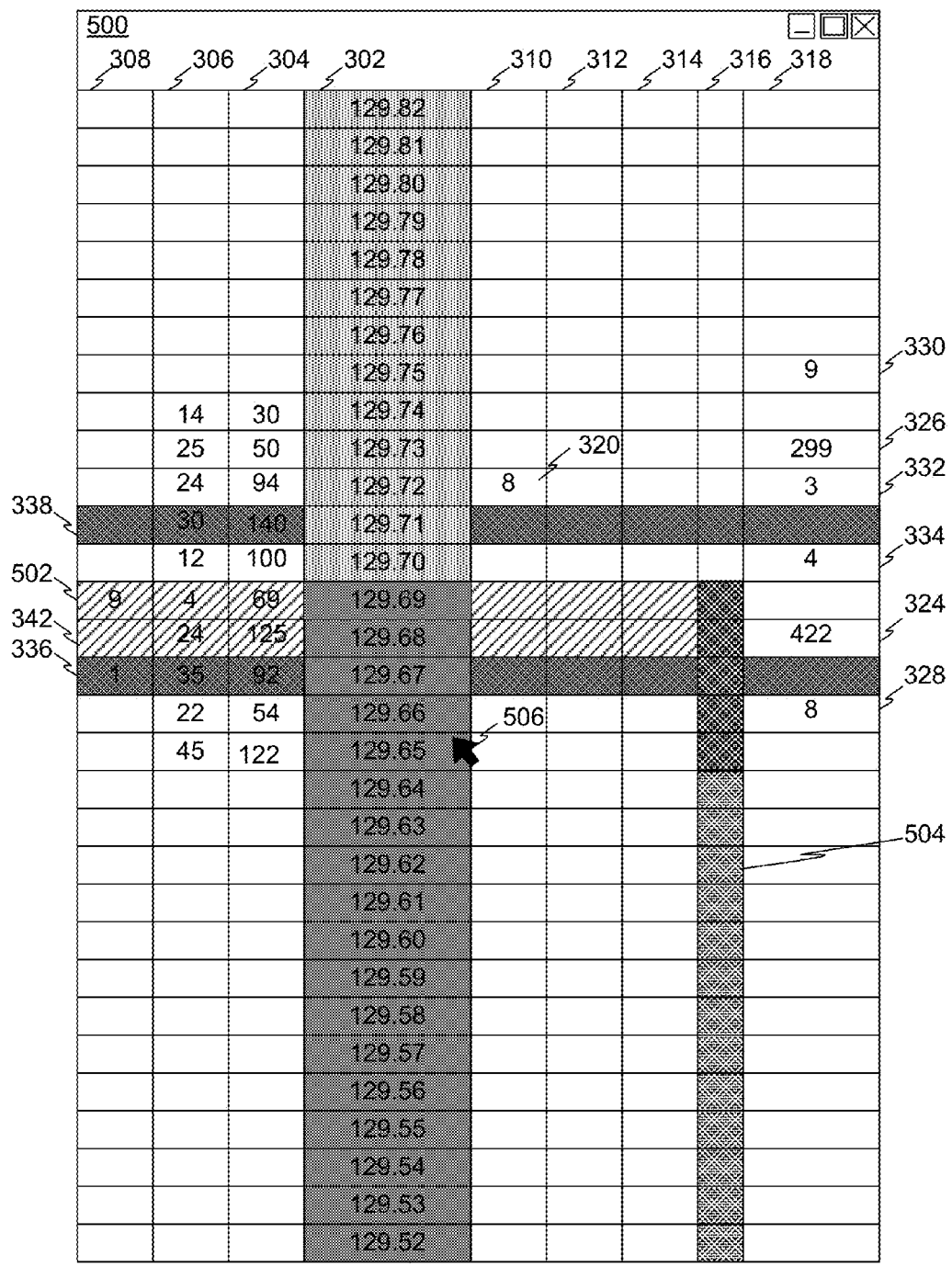
FIG. 5 is a block diagram illustrating a later view of the trading interface shown in FIG. 3 upon receiving a new market update.

FIG. 5 is a block diagram illustrating a subsequent view of the trading interface shown in FIG. 3 after receiving a next market update. As shown in FIG. 5, the inside market is now 1 tick higher compared to the inside market in FIG. 3, with the current best bid at 129.69 and the current best ask at 129.70. As shown in FIG. 5, the current best bid at 129.69 and the best ask at 129.70 are positioned slightly above the center of the interface 500. Also, based on the current market conditions, the market data displayed in the interface has been dynamically updated. It should be noted; however, that with the use of the 2:1 ratio in relation to the inside market, since the inside market has moved only one tick, no repositioning took place.

The trading interface 500 shows the bid line 342 from FIG. 3, and a new bid line 502 that was created at 129.69. As explained earlier, a new bid line is created when a quantity at a price level corresponding to an ask line is bought or cancelled, and a new best bid is positioned at that price level, thus, indicating a turn in the market, as in the instant case. Comparing market conditions depicted in FIGS. 3 and 4, the ask line 340 corresponding to the best ask was shown in FIG. 3 at 129.69. Then, as shown in FIG. 5, based on the new update, the market activity created a turn in the market, resulting in the best bid now pending at 129.69, thus, causing creation of the new bid line at 129.69.

As the market has not crossed any of the market movement lines 336 and 338 shown in FIG. 3, the interface 500 continues to show the market movement lines 338 and 336 at the original price levels.

The trading interface 500 also indicates in the column 308 the total quantity traded on the current best bid, which in this example corresponds to a total quantity of 9 that was bought when in a previous market state the ask was offered at 129.69, and a new bid became active at 129.69 after the quantity of 9 was bought. Column 308 also shows the total quantity traded "1" on the bid at 129.67 that was sold at 129.67 when the best bid was at 129.67. The column 306 displays updated values for the number of pending orders that create the overall market depth quantity displayed at each corresponding price level in the market depth column 304. A point of reference marker 504 in column 316 indicates that the current best bid at 129.69 is higher than the previous best bid. Also, the values of indicators 324-334 displayed in the column 318 have been updated based on the current market conditions.

As explained in relation to FIG. 3, a trader has the ability to lock a cursor to a desired location on a trading screen so that when the market information displayed on the interface changes, such as shown in FIG. 5, the cursor is moved as the selected value changes location on the interface. Referring back to FIG. 3, the cursor was locked at the value of 129.65. Now, in FIG. 5, despite the change in the view of the display upon the market movement, the cursor remained located at the value of 129.65, as shown at 506.

Figure 6:
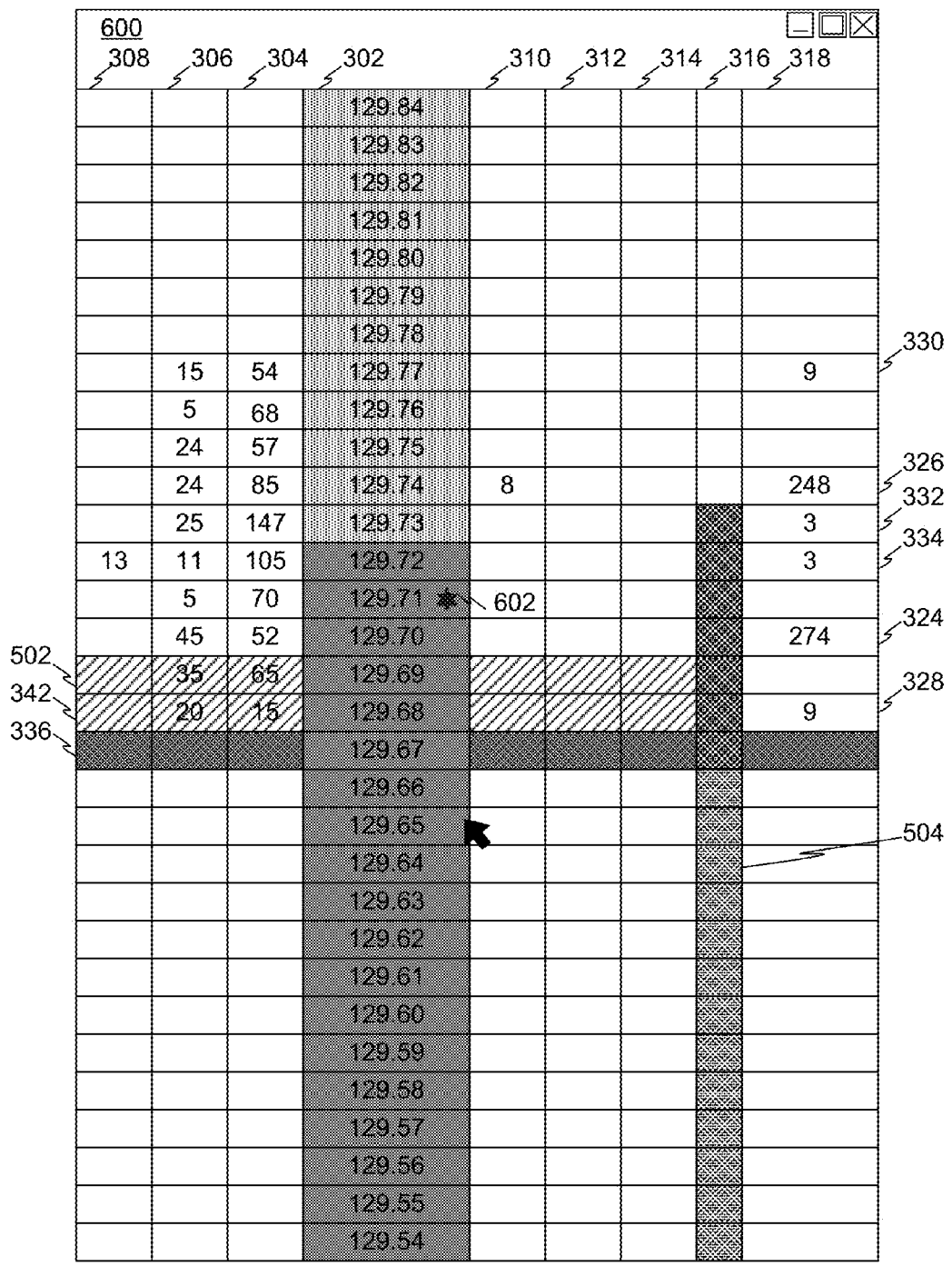
FIG. 6 is a block diagram illustrating a later view of the trading interface shown in FIG. 5 upon receiving a new market update.

FIG. 6 is a block diagram illustrating a view of the trading interface shown in FIG. 5 after receiving a new market update.

As compared to the market conditions shown in FIG. 5, the inside market is now at 129.72 and 129.73, which correspond to the best bid and the best ask, respectively. Using the 2:1 ratio, and based on the adjustment method described above, the market view between the snapshots in FIGS. 6 and 3 has been adjusted to keep the display of current market data substantially at the center of the trading screen.

As the market moved up a few ticks levels compared to the market conditions in FIG. 5, no additional bid or ask lines were created, thus, leaving the bid lines 342 and 502 intact. However, as the market crossed the price level of the market movement indicator 338 shown in FIG. 5, the market movement indicator has been modified to signal to a trader that the market crossed the marked price level. As mentioned earlier, different means could be used to alert a trader of the market movement beyond the price level marked with the indicator. In FIG. 6, a new indicator 602 is displayed in relation to the price level of 129.71 that corresponded to the indicator in FIG. 5. Also, as the market did not cross the price level corresponding to the market movement indicator 336, the indicator 336 remained displayed, as shown in FIG. 6.

As explained in relation to the proceedings figures, once again the values displayed in each region of the interface 600 are updated to reflect the current market conditions. Also, as the market data displayed on the interface 600 dynamically changed to reflect current market conditions, and the cursor was dynamically repositioned as well to remain displayed at 129.65.

Figure 7:
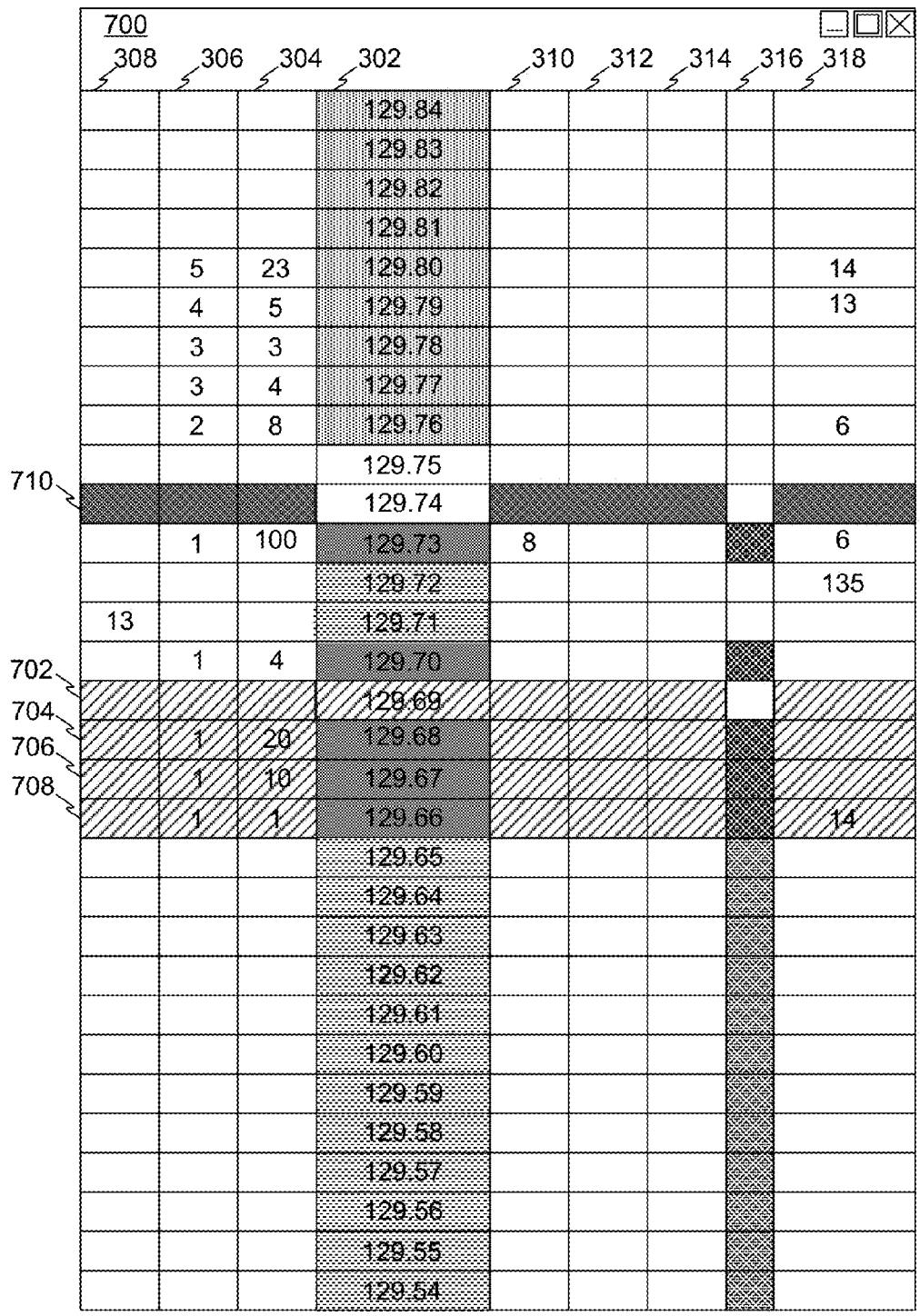
FIG. 7 is a block diagram illustrating an interface for displaying market data having market depth showing price gaps.
Figure 8:
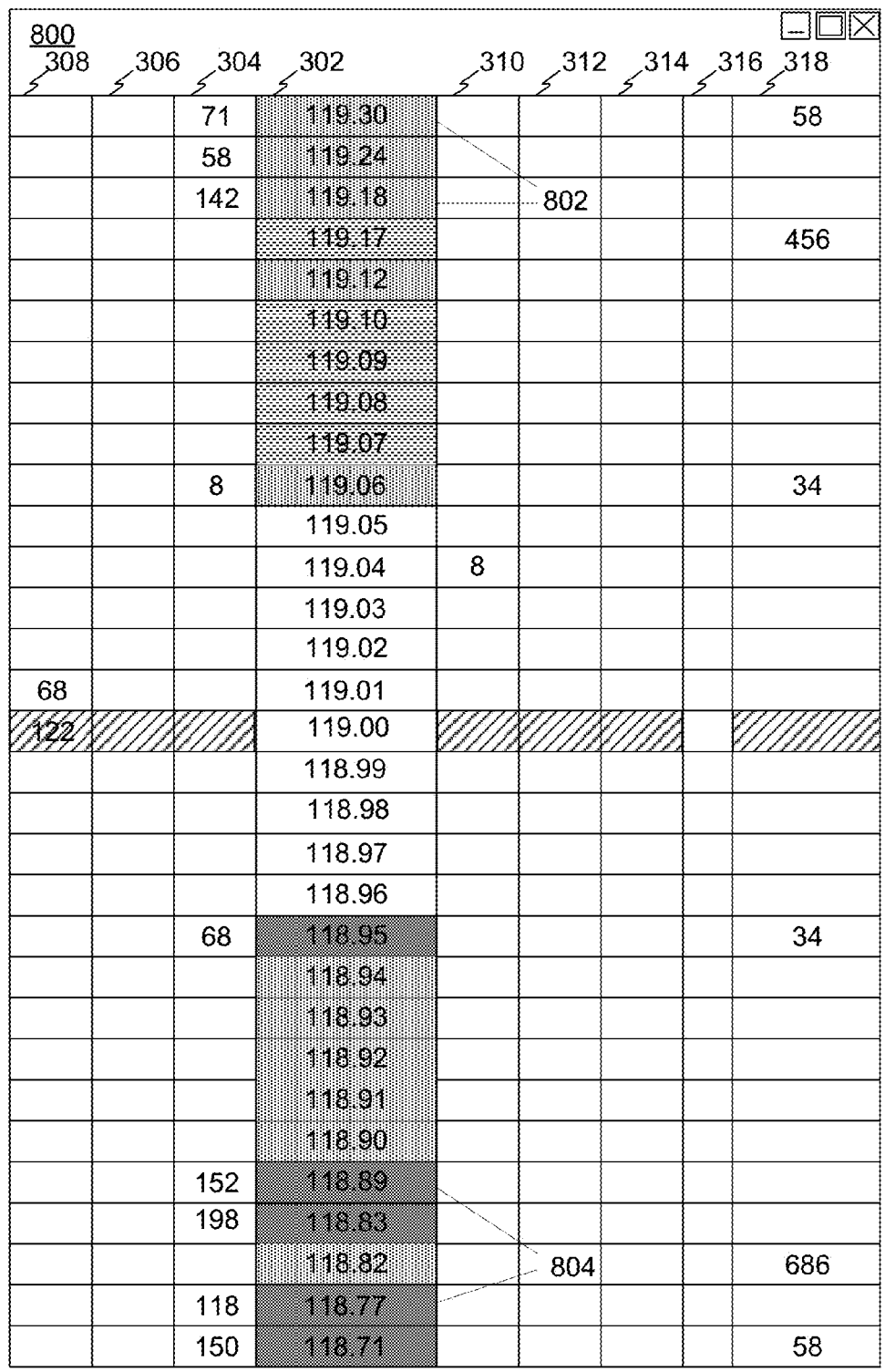
FIG. 8 is a block diagram that illustrates a trading interface for displaying market depth having non-contiguous tradeable price levels and a range of prices greater than a viewable price range.

While FIGS. 3, 5, and 6, show interfaces that display market depth having continuous market prices, some market conditions may result in creation of gaps between tradeable prices (prices having pending quantities). FIGS. 7-8 illustrate example interfaces that will be used to display market depth with price gaps. While each figure displays a continuous value axis, it should be understood that some or all cells corresponding to bid and ask prices with no tradeable quantities could be collapsed so that mostly tradeable prices would be displayed within the market depth range, the embodiments of which will be described later.

FIG. 7 is a block diagram illustrating an interface 800 for displaying market data having price gaps. As shown in FIG. 7, the price grid range on the value axis 302 falls between 129.84 and 129.54, with the best bid at 129.73 and the best ask at 129.76. As shown in FIG. 7, different shade or different color could be used in relation to price levels with no pending quantity, such as the price level of 129.72 below the best bid. For example, lighter blue could be used in relation to the price level of 129.72 and other such price levels on the bid side, and lighter red could be used in relation to price levels with no pending quantities on the ask side of the market depth. Yet, a different color could be used to indicate a price gap between the best bid and the best ask, such as the gap corresponding to 129.75 and 129.74. The interface 800 shows four bid lines 702, 704, 706, and 708, and one ask line 710.

The interface 700 also includes a point of reference marker 702 in column 316. As shown in FIG. 7, the point of reference marker 702 is color-coded to indicate prices with pending quantities. As shown, the portions of the marker 702 corresponding to value cells with pending quantities are darker than those with no pending quantities. However, different embodiments could be used as well to indicate market depth levels with no pending quantity. The interface 700 also includes previously described indicators displayed in the plurality of columns, with the values of the indicators updated based on the current market conditions. Also, as shown, the cursor remains locked at the value of 129.65.

Some markets, in addition to non-contiguous price values, may have a market depth range that is greater than a range of displayable price levels on a trading interface. To enable a trader to view the entire range of market depth, one example trading interface allows for collapsing cells/rows corresponding to non-tradeable prices between the non-contiguous but tradeable price levels furthest away from the inside market so that a trader can view the entire market range. FIG. 8 is a block diagram that illustrates a trading interface 800 that displays market depth having non-contiguous tradeable price levels and a range of prices greater than a viewable price range. As shown at the interface 800, the best bid and the best ask are at 118.95 and 119.06, respectively, creating a gap of prices with no tradeable quantities.

According to one example embodiment, the trading interface 800 displays the worst bid and the worst ask with pending quantities by compressing cells having no tradeable quantities in the lowermost and the uppermost portions of the interface 800, such as shown at 804 and 802, respectively. Because many traders tend to enter orders a few ticks away from the inside market, one example embodiment does not collapse non-tradeable price levels that are located close to the inside market levels. Two such areas are shown in the interface 800 that displays 5 price levels having no pending quantity on the bid side, and 4 such price levels on the ask side. It should be understood that a trader could enter orders at prices or in between prices that have no physical location on the interface 800, such as one of the prices in the collapsed range 802, by entering a predetermined user selection input that would result in display of the collapsed prices. For example, a different user selection input could be used to display collapsed prices on the ask side of the market depth, and a different input could be used to display collapsed prices on the bid side.

It will be apparent to those of ordinary skill in the art that methods involved in the system and methods described above may be embodied in a computer program product that includes one or more computer readable media. For example, a computer readable medium can include a readable memory device, such as a hard drive device, a CD-ROM, a DVD-ROM, or a computer diskette, having computer readable program code segments stored thereon. The computer readable medium can also include a communications or transmission medium, such as, a bus or a communication link, either optical, wired or wireless having program code segments carried thereon as digital or analog data signals.

The claims should not be read as limited to the described order or elements unless stated to that effect. Therefore, all embodiments that come within the scope and spirit of the following claims and equivalents thereto are claimed as the invention.

The invention claimed is:

1. A computing device for displaying market data comprising:
   a market data receiver configured to receive market data from an electronic exchange, the market data including market updates for at least a pending best bid having a best bid price for a tradeable object and for a pending best ask having a best ask price for the tradeable object;
   an electronic display device configured to display a price axis for the tradeable object, the price axis including a first plurality of price levels derived from the market data defined by a highest price level and a lowest price level, where the electronic display device displays a first indicator along the price axis at a first price level corresponding to the best bid price, a second indicator along the price axis at a second price level corresponding to the best ask price and a market movement indicator along the price axis at a user-selected price level; and
   an electronic processor coupled with the market data receiver and the electronic display device and configured to:
      determine whether at least one of the first indicator displayed along the price axis at the first price level and the second indicator displayed along the price axis at the second price level is displayed at a location being outside a range defined by a reference point of the electronic display device,
      in response to determining that the at least one of the first indicator and the second indicator is displayed at the location outside a range defined by the reference point, calculate a number of price levels by which to adjust the price axis to a new plurality of price levels, and responsively
      cause the electronic display to adjust the display of the price axis by the calculated number of price levels, such that subsequent to adjusting the display of the price axis, the at least one of the first indicator and the second indicator is displayed within the range defined by the reference point, the market movement indicator is moved to a new location representing the movement of the market, and the price axis has a second plurality of price levels defined by a new highest price level and a new lowest price level.

2. The computing device of claim 1 where the electronic display is further configured to display a point of reference marker over a range of price levels of the price axis.

3. The computing device of claim 2 where the range of price levels includes a user-determined price level.

4. The computing device of claim 3 where the user-determined price level comprises any of the first price level, the second price level and a last traded price at a time when a recentering command is received.

5. The computing device of claim 2 where the range of price levels comprises any of the first price level, the second price level and a last traded price at current time.

6. The computing device of claim 1, where the electronic display is further configured to adjust the view of the price axis, including the first indicator, the second indicator, and the market movement indicator, to a predetermined location in response to a user command.

7. The computing device of claim 6 where the electronic display adjusts the view of the price axis where according to substantially centering the price axis in a region for displaying the indicators along the price axis.

8. The computing device of claim 1, where the electronic display is further configured to display a plurality of bid indicators for the tradeable object along the price axis, each of the plurality of bid indicators being associated with at least one bid pending at the electronic exchange and being displayed at one of a plurality of price levels corresponding to a bid price of the associated at least one bid.

9. The computing device of claim 1, where the electronic display is further configured to display a plurality of ask indicators for the tradeable object along the price axis, each of the plurality of ask indicators being associated with at least one ask pending at the electronic exchange and being displayed at one of a plurality of price levels corresponding to an ask price of the associated at least one ask.

* * * * *